(12) United States Patent
Tyger

(10) Patent No.: US 7,668,415 B2
(45) Date of Patent: Feb. 23, 2010

(54) METHOD AND DEVICE FOR PROVIDING ELECTRONIC CIRCUITRY ON A BACKPLATE

(75) Inventor: Karen Tyger, Foster City, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 86 days.

(21) Appl. No.: 11/090,491

(22) Filed: Mar. 25, 2005

(65) Prior Publication Data

US 2006/0067642 A1    Mar. 30, 2006

Related U.S. Application Data

(60) Provisional application No. 60/613,977, filed on Sep. 27, 2004.

(51) Int. Cl.
G02B 6/12 (2006.01)
G02B 26/00 (2006.01)

(52) U.S. Cl. .................. 385/14; 385/8; 385/18; 385/19; 359/290; 359/291; 359/292; 359/293; 359/294; 359/295; 359/245; 359/246; 359/247; 359/248

(58) Field of Classification Search ......... 359/290–295, 359/528–529, 298, 244–248, 656–661, 672–673; 428/690; 385/147, 8, 14, 18; 257/704

See application file for complete search history.

(56) References Cited

U.S. PATENT DOCUMENTS

| | | | |
|---|---|---|---|
| 2,534,846 A | 12/1950 | Ambrose et al. | |
| 3,439,973 A | 4/1969 | Paul et al. | |
| 3,443,854 A | 5/1969 | Weiss | |
| 3,653,741 A | 4/1972 | Marks | |
| 3,656,836 A | 4/1972 | de Cremoux et al. | |
| 3,813,265 A | 5/1974 | Marks | |
| 3,955,880 A | 5/1976 | Lierke | |
| 4,036,360 A | 7/1977 | Deffeyes | |
| 4,074,480 A | 2/1978 | Burton | |
| 4,099,854 A | 7/1978 | Decker et al. | |
| 4,228,437 A | 10/1980 | Shelton | |
| 4,310,220 A | 1/1982 | Kuwagaki et al. | |

(Continued)

FOREIGN PATENT DOCUMENTS

CN    1449990    10/2003

(Continued)

OTHER PUBLICATIONS

Akasaka, "Three-Dimensional IC Trends", Proceedings of IEEE, vol. 74, No. 12, pp. 1703-1714, (Dec. 1986).

(Continued)

*Primary Examiner*—Frank G Font
*Assistant Examiner*—Guy G Anderson
(74) *Attorney, Agent, or Firm*—Knobbe Martens Olson & Bear LLP

(57) ABSTRACT

A MEMS-based display device is described, wherein an array of interferometric modulators are configured to reflect light through a transparent substrate. The transparent substrate is sealed to a backplate and the backplate may contain electronic circuitry fabricated on the backplane. The electronic circuitry is placed in electrical communication with the array of interferometric modulators and is configured to control the state of the array of interferometric modulators.

24 Claims, 9 Drawing Sheets

U.S. PATENT DOCUMENTS

| | | | |
|---|---|---|---|
| 4,377,324 A | 3/1983 | Durand et al. | |
| 4,383,255 A | 5/1983 | Grandjean et al. | |
| 4,389,096 A | 6/1983 | Hori et al. | |
| 4,403,248 A | 9/1983 | te Velde | |
| 4,431,691 A | 2/1984 | Greenlee | |
| 4,441,791 A | 4/1984 | Hornbeck | |
| 4,445,050 A | 4/1984 | Marks | |
| 4,459,182 A | 7/1984 | te Velde | |
| 4,482,213 A | 11/1984 | Piliavin et al. | |
| 4,500,171 A | 2/1985 | Penz et al. | |
| 4,519,676 A | 5/1985 | te Velde | |
| 4,531,126 A | 7/1985 | Sadones | |
| 4,566,935 A | 1/1986 | Hornbeck | |
| 4,571,603 A | 2/1986 | Hornbeck et al. | |
| 4,596,992 A | 6/1986 | Hornbeck | |
| 4,615,595 A | 10/1986 | Hornbeck | |
| 4,662,746 A | 5/1987 | Hornbeck | |
| 4,663,083 A | 5/1987 | Marks | |
| 4,681,403 A | 7/1987 | te Velde et al. | |
| 4,710,732 A | 12/1987 | Hornbeck | |
| 4,748,366 A | 5/1988 | Taylor | |
| 4,786,128 A | 11/1988 | Birnbach | |
| 4,790,635 A | 12/1988 | Apsley | |
| 4,856,863 A | 8/1989 | Sampsell et al. | |
| 4,954,789 A | 9/1990 | Sampsell | |
| 4,956,619 A | 9/1990 | Hornbeck | |
| 4,977,009 A | 12/1990 | Anderson et al. | |
| 4,982,184 A | 1/1991 | Kirkwood | |
| 5,018,256 A | 5/1991 | Hornbeck | |
| 5,022,745 A | 6/1991 | Zahowski et al. | |
| 5,028,939 A | 7/1991 | Hornbeck et al. | |
| 5,037,173 A | 8/1991 | Sampsell et al. | |
| 5,044,736 A | 9/1991 | Jaskie et al. | |
| 5,061,049 A | 10/1991 | Hornbeck | |
| 5,075,796 A | 12/1991 | Schildkraut et al. | |
| 5,078,479 A | 1/1992 | Vuilleumier | |
| 5,079,544 A | 1/1992 | DeMond et al. | |
| 5,083,857 A | 1/1992 | Hornbeck | |
| 5,096,279 A | 3/1992 | Hornbeck et al. | |
| 5,099,353 A | 3/1992 | Hornbeck | |
| 5,124,834 A | 6/1992 | Cusano et al. | |
| 5,142,405 A | 8/1992 | Hornbeck | |
| 5,142,414 A | 8/1992 | Koehler | |
| 5,153,771 A | 10/1992 | Link et al. | |
| 5,162,787 A | 11/1992 | Thompson et al. | |
| 5,168,406 A | 12/1992 | Nelson | |
| 5,170,156 A | 12/1992 | DeMond et al. | |
| 5,172,262 A | 12/1992 | Hornbeck | |
| 5,179,274 A | 1/1993 | Sampsell | |
| 5,192,395 A | 3/1993 | Boysel et al. | |
| 5,192,946 A | 3/1993 | Thompson et al. | |
| 5,206,629 A | 4/1993 | DeMond et al. | |
| 5,214,419 A | 5/1993 | DeMond et al. | |
| 5,214,420 A | 5/1993 | Thompson et al. | |
| 5,216,537 A | 6/1993 | Hornbeck | |
| 5,226,099 A | 7/1993 | Mignardi et al. | |
| 5,231,532 A | 7/1993 | Magel et al. | |
| 5,233,385 A | 8/1993 | Sampsell | |
| 5,233,456 A | 8/1993 | Nelson | |
| 5,233,459 A | 8/1993 | Bozler et al. | |
| 5,244,707 A | 9/1993 | Shores | |
| 5,254,980 A | 10/1993 | Hendrix et al. | |
| 5,268,533 A | 12/1993 | Kovacs et al. | |
| 5,272,473 A | 12/1993 | Thompson et al. | |
| 5,278,652 A | 1/1994 | Urbanus et al. | |
| 5,280,277 A | 1/1994 | Hornbeck | |
| 5,287,096 A | 2/1994 | Thompson et al. | |
| 5,296,950 A | 3/1994 | Lin et al. | |
| 5,304,419 A | 4/1994 | Shores | |
| 5,305,640 A | 4/1994 | Boysel et al. | |
| 5,311,360 A | 5/1994 | Bloom et al. | |
| 5,312,513 A | 5/1994 | Florence et al. | |
| 5,323,002 A | 6/1994 | Sampsell et al. | |
| 5,325,116 A | 6/1994 | Sampsell | |
| 5,327,286 A | 7/1994 | Sampsell et al. | |
| 5,331,454 A | 7/1994 | Hornbeck | |
| 5,339,116 A | 8/1994 | Urbanus et al. | |
| 5,365,283 A | 11/1994 | Doherty et al. | |
| 5,381,253 A | 1/1995 | Sharp et al. | |
| 5,385,255 A * | 1/1995 | Varano et al. | 229/404 |
| 5,401,983 A | 3/1995 | Jokerst et al. | |
| 5,411,769 A | 5/1995 | Hornbeck | |
| 5,444,566 A | 8/1995 | Gale et al. | |
| 5,446,479 A | 8/1995 | Thompson et al. | |
| 5,448,314 A | 9/1995 | Heimbuch et al. | |
| 5,452,024 A | 9/1995 | Sampsell | |
| 5,454,906 A | 10/1995 | Baker et al. | |
| 5,457,493 A | 10/1995 | Leddy et al. | |
| 5,457,566 A | 10/1995 | Sampsell et al. | |
| 5,459,602 A | 10/1995 | Sampsell | |
| 5,459,610 A | 10/1995 | Bloom et al. | |
| 5,461,411 A | 10/1995 | Florence et al. | |
| 5,489,952 A | 2/1996 | Gove et al. | |
| 5,497,172 A | 3/1996 | Doherty et al. | |
| 5,497,197 A | 3/1996 | Gove et al. | |
| 5,499,062 A | 3/1996 | Urbanus | |
| 5,500,635 A | 3/1996 | Mott | |
| 5,500,761 A | 3/1996 | Goossen et al. | |
| 5,506,597 A | 4/1996 | Thompson et al. | |
| 5,515,076 A | 5/1996 | Thompson et al. | |
| 5,517,347 A | 5/1996 | Sampsell | |
| 5,523,803 A | 6/1996 | Urbanus et al. | |
| 5,526,051 A | 6/1996 | Gove et al. | |
| 5,526,172 A | 6/1996 | Kanack | |
| 5,526,688 A | 6/1996 | Boysel et al. | |
| 5,535,047 A | 7/1996 | Hornbeck | |
| 5,548,301 A | 8/1996 | Kornher et al. | |
| 5,551,293 A | 9/1996 | Boysel et al. | |
| 5,552,924 A | 9/1996 | Tregilgas | |
| 5,563,398 A | 10/1996 | Sampsell | |
| 5,567,334 A | 10/1996 | Baker et al. | |
| 5,570,135 A | 10/1996 | Gove et al. | |
| 5,579,149 A | 11/1996 | Moret et al. | |
| 5,581,272 A | 12/1996 | Conner et al. | |
| 5,583,688 A | 12/1996 | Hornbeck | |
| 5,589,852 A | 12/1996 | Thompson et al. | |
| 5,591,379 A | 1/1997 | Shores | |
| 5,597,736 A | 1/1997 | Sampsell | |
| 5,600,383 A | 2/1997 | Hornbeck | |
| 5,602,671 A | 2/1997 | Hornbeck | |
| 5,606,441 A | 2/1997 | Florence et al. | |
| 5,608,468 A | 3/1997 | Gove et al. | |
| 5,610,438 A | 3/1997 | Wallace et al. | |
| 5,610,624 A | 3/1997 | Bhuva | |
| 5,610,625 A | 3/1997 | Sampsell | |
| 5,619,059 A | 4/1997 | Li et al. | |
| 5,619,365 A | 4/1997 | Rhoades et al. | |
| 5,619,366 A | 4/1997 | Rhoads et al. | |
| 5,636,052 A | 6/1997 | Arney et al. | |
| 5,646,768 A | 7/1997 | Kaeiyama | |
| 5,650,881 A | 7/1997 | Hornbeck | |
| 5,654,741 A | 8/1997 | Sampsell et al. | |
| 5,657,099 A | 8/1997 | Doherty et al. | |
| 5,659,374 A | 8/1997 | Gale, Jr. et al. | |
| 5,665,997 A | 9/1997 | Weaver et al. | |
| 5,703,710 A | 12/1997 | Brinkman et al. | |
| 5,710,656 A | 1/1998 | Goosen | |
| 5,717,476 A | 2/1998 | Kanezawa | |
| 5,739,945 A | 4/1998 | Tayebati | |
| 5,745,193 A | 4/1998 | Urbanus et al. | |
| 5,745,281 A | 4/1998 | Yi et al. | |
| 5,771,116 A | 6/1998 | Miller et al. | |
| 5,771,321 A | 6/1998 | Stern | |
| 5,784,189 A | 7/1998 | Bozler et al. | |

| Patent No. | Date | Inventor | Ref |
|---|---|---|---|
| 5,784,190 A | 7/1998 | Worley | |
| 5,784,212 A | 7/1998 | Hornbeck | |
| 5,815,141 A | 9/1998 | Phares | |
| 5,818,095 A | 10/1998 | Sampsell | |
| 5,825,528 A | 10/1998 | Goosen | |
| 5,835,255 A * | 11/1998 | Miles | 359/291 |
| 5,842,088 A | 11/1998 | Thompson | |
| 5,853,662 A | 12/1998 | Watanabe | |
| 5,856,820 A | 1/1999 | Weigers et al. | |
| 5,912,758 A | 6/1999 | Knipe et al. | |
| 5,936,758 A | 8/1999 | Fisher et al. | |
| 5,939,785 A | 8/1999 | Klonis et al. | |
| 5,959,763 A | 9/1999 | Bozler et al. | |
| 5,986,796 A | 11/1999 | Miles | |
| 5,999,306 A | 12/1999 | Atobe et al. | |
| 6,028,690 A | 2/2000 | Carter et al. | |
| 6,038,056 A | 3/2000 | Florence et al. | |
| 6,040,937 A * | 3/2000 | Miles | 359/291 |
| 6,049,317 A | 4/2000 | Thompson et al. | |
| 6,055,090 A * | 4/2000 | Miles | 359/291 |
| 6,061,075 A | 5/2000 | Nelson et al. | |
| 6,099,132 A | 8/2000 | Kaeriyama | |
| 6,107,115 A | 8/2000 | Atobe et al. | |
| 6,113,239 A | 9/2000 | Sampsell et al. | |
| 6,120,339 A | 9/2000 | Alwan | |
| 6,127,765 A | 10/2000 | Fushinobu | |
| 6,147,790 A | 11/2000 | Meier et al. | |
| 6,160,833 A | 12/2000 | Floyd et al. | |
| 6,180,428 B1 | 1/2001 | Peeters et al. | |
| 6,195,196 B1 | 2/2001 | Kimura et al. | |
| 6,201,633 B1 | 3/2001 | Peeters et al. | |
| 6,232,936 B1 | 5/2001 | Gove et al. | |
| 6,238,755 B1 | 5/2001 | Harvey et al. | |
| 6,282,010 B1 | 8/2001 | Sulzbach et al. | |
| 6,295,154 B1 | 9/2001 | Laor et al. | |
| 6,303,986 B1 | 10/2001 | Shook | |
| 6,323,982 B1 | 11/2001 | Hornbeck | |
| 6,365,229 B1 | 4/2002 | Robbins | |
| 6,379,988 B1 | 4/2002 | Peterson et al. | |
| 6,426,124 B2 | 7/2002 | Olster et al. | |
| 6,426,461 B1 | 7/2002 | Ginter et al. | |
| 6,447,126 B1 | 9/2002 | Hornbeck | |
| 6,455,927 B1 | 9/2002 | Glenn et al. | |
| 6,462,392 B1 | 10/2002 | Pinter et al. | |
| 6,465,355 B1 | 10/2002 | Horsley | |
| 6,466,354 B1 * | 10/2002 | Gudeman | 359/247 |
| 6,466,358 B2 | 10/2002 | Tew | |
| 6,472,739 B1 | 10/2002 | Wood et al. | |
| 6,473,274 B1 | 10/2002 | Maimone et al. | |
| 6,480,177 B2 | 11/2002 | Doherty et al. | |
| 6,489,670 B1 | 12/2002 | Peterson et al. | |
| 6,495,895 B1 | 12/2002 | Peterson et al. | |
| 6,496,122 B2 | 12/2002 | Sampsell | |
| 6,507,385 B1 | 1/2003 | Nishiyama et al. | |
| 6,525,416 B2 | 2/2003 | Hauser et al. | |
| 6,538,312 B1 | 3/2003 | Peterson et al. | |
| 6,545,335 B1 | 4/2003 | Chua et al. | |
| 6,548,908 B2 | 4/2003 | Chua et al. | |
| 6,549,338 B1 | 4/2003 | Wolverton et al. | |
| 6,552,840 B2 | 4/2003 | Knipe | |
| 6,558,820 B2 * | 5/2003 | Raychaudhuri et al. | 428/690 |
| 6,574,033 B1 | 6/2003 | Chui et al. | |
| 6,583,921 B2 | 6/2003 | Nelson | |
| 6,589,625 B1 | 7/2003 | Kothari et al. | |
| 6,600,201 B2 | 7/2003 | Hartwell et al. | |
| 6,603,182 B1 | 8/2003 | Low et al. | |
| 6,606,175 B1 | 8/2003 | Sampsell et al. | |
| 6,625,047 B2 | 9/2003 | Coleman, Jr. | |
| 6,630,786 B2 | 10/2003 | Cummings et al. | |
| 6,632,698 B2 | 10/2003 | Ives | |
| 6,643,069 B2 | 11/2003 | Dewald | |
| 6,650,455 B2 | 11/2003 | Miles | |
| 6,661,084 B1 | 12/2003 | Peterson et al. | |
| 6,666,561 B1 | 12/2003 | Blakley | |
| 6,674,159 B1 | 1/2004 | Peterson et al. | |
| 6,674,562 B1 | 1/2004 | Miles | |
| 6,680,792 B2 | 1/2004 | Miles | |
| 6,690,444 B1 * | 2/2004 | Wilkinson et al. | 349/153 |
| 6,710,908 B2 | 3/2004 | Miles et al. | |
| 6,741,377 B2 | 5/2004 | Miles | |
| 6,741,384 B1 | 5/2004 | Martin et al. | |
| 6,741,503 B1 | 5/2004 | Farris et al. | |
| 6,747,785 B2 | 6/2004 | Chen et al. | |
| 6,775,174 B2 | 8/2004 | Huffman et al. | |
| 6,778,046 B2 | 8/2004 | Stafford et al. | |
| 6,778,155 B2 | 8/2004 | Doherty et al. | |
| 6,779,260 B1 | 8/2004 | Brandenburg et al. | |
| 6,794,119 B2 | 9/2004 | Miles | |
| 6,811,267 B1 | 11/2004 | Allen et al. | |
| 6,819,469 B1 | 11/2004 | Koba | |
| 6,822,628 B2 | 11/2004 | Dunphy et al. | |
| 6,829,132 B2 | 12/2004 | Martin et al. | |
| 6,833,668 B1 | 12/2004 | Yamada et al. | |
| 6,843,936 B1 | 1/2005 | Jacobs | |
| 6,853,129 B1 | 2/2005 | Cummings et al. | |
| 6,855,610 B2 | 2/2005 | Tung et al. | |
| 6,859,218 B1 | 2/2005 | Luman et al. | |
| 6,861,277 B1 | 3/2005 | Monroe et al. | |
| 6,862,022 B2 | 3/2005 | Slupe | |
| 6,862,029 B1 | 3/2005 | D'Souza et al. | |
| 6,867,896 B2 | 3/2005 | Miles | |
| 6,870,581 B2 | 3/2005 | Li et al. | |
| 6,882,458 B2 | 4/2005 | Lin et al. | |
| 6,882,480 B2 | 4/2005 | Yanagisawa | |
| 6,914,245 B2 | 7/2005 | Sone et al. | |
| 6,940,631 B2 | 9/2005 | Ishikawa | |
| 6,947,200 B2 | 9/2005 | Huibers | |
| 6,995,890 B2 | 2/2006 | Lin | |
| 6,999,225 B2 | 2/2006 | Lin et al. | |
| 7,015,885 B2 * | 3/2006 | Novotny et al. | 345/84 |
| 7,019,458 B2 | 3/2006 | Yoneda | |
| 7,034,984 B2 | 4/2006 | Pan et al. | |
| 7,046,374 B1 | 5/2006 | Barbarossa | |
| 7,116,462 B2 | 10/2006 | Ikeda | |
| 7,123,216 B1 | 10/2006 | Miles | |
| 7,126,741 B2 * | 10/2006 | Wagner et al. | 359/290 |
| 7,161,728 B2 | 1/2007 | Sampsell et al. | |
| 7,413,416 B2 | 8/2008 | Bratu | |
| 7,456,497 B2 * | 11/2008 | Higashi | 257/704 |
| 2001/0003487 A1 | 6/2001 | Miles | |
| 2001/0004085 A1 | 6/2001 | Gueissaz | |
| 2001/0055146 A1 | 12/2001 | Atobe et al. | |
| 2002/0012364 A1 | 1/2002 | Kalian et al. | |
| 2002/0015215 A1 | 2/2002 | Miles | |
| 2002/0024711 A1 | 2/2002 | MIles | |
| 2002/0043706 A1 | 4/2002 | Jerominek et al. | |
| 2002/0052392 A1 | 5/2002 | Day et al. | |
| 2002/0054424 A1 | 5/2002 | Miles | |
| 2002/0056898 A1 | 5/2002 | Lopes et al. | |
| 2002/0056900 A1 | 5/2002 | Liu et al. | |
| 2002/0057565 A1 | 5/2002 | Seo | |
| 2002/0075551 A1 | 6/2002 | Daneman et al. | |
| 2002/0075555 A1 | 6/2002 | Miles | |
| 2002/0126364 A1 | 9/2002 | Miles | |
| 2002/0160583 A1 | 10/2002 | Song | |
| 2002/0187254 A1 | 12/2002 | Ghosh | |
| 2003/0020094 A1 | 1/2003 | Shrauger | |
| 2003/0043157 A1 | 3/2003 | Miles | |
| 2003/0054588 A1 | 3/2003 | Patel et al. | |
| 2003/0062186 A1 | 4/2003 | Boroson et al. | |
| 2003/0072070 A1 | 4/2003 | Miles | |
| 2003/0075794 A1 | 4/2003 | Felton et al. | |
| 2003/0108306 A1 | 6/2003 | Whitney et al. | |
| 2003/0144034 A1 * | 7/2003 | Hack et al. | 455/566 |
| 2003/0152872 A1 | 8/2003 | Miles | |
| 2003/0161126 A1 * | 8/2003 | Wilkinson et al. | 361/788 |

| | | | | | | |
|---|---|---|---|---|---|---|
| 2003/0183916 | A1 | 10/2003 | Heck et al. | JP | 2002-258310 | 9/2002 |
| 2003/0184412 | A1 | 10/2003 | Gorrell | JP | 2002-296519 | 10/2002 |
| 2003/0202264 | A1 | 10/2003 | Weber et al. | JP | 2002-312066 | 10/2002 |
| 2003/0202265 | A1 | 10/2003 | Reboa et al. | JP | 2002-328313 | 11/2002 |
| 2003/0202266 | A1 | 10/2003 | Ring et al. | JP | 2002-357846 | 12/2002 |
| 2004/0051929 | A1 | 3/2004 | Sampsell et al. | JP | 2003-075741 | 3/2003 |
| 2004/0058532 | A1 | 3/2004 | Miles et al. | JP | 2003-233024 | 8/2003 |
| 2004/0061492 | A1 | 4/2004 | Lopes et al. | JP | 2003-330001 | 11/2003 |
| 2004/0080807 | A1 | 4/2004 | Chen et al. | JP | 2004-053852 | 2/2004 |
| 2004/0100677 | A1 | 5/2004 | Huibers et al. | JP | 2004-78107 | 3/2004 |
| 2004/0140557 | A1 | 7/2004 | Sun et al. | JP | 2004-118001 | 4/2004 |
| 2004/0145049 | A1 | 7/2004 | McKinnell et al. | WO | WO 95/01624 | 1/1995 |
| 2004/0147056 | A1 | 7/2004 | McKinnell et al. | WO | WO9530924 | 11/1995 |
| 2004/0150319 | A1 | 8/2004 | Tomimatsu et al. | WO | WO9717628 | 5/1997 |
| 2004/0160143 | A1 | 8/2004 | Shreeve et al. | WO | WO 98/06118 | 2/1998 |
| 2004/0163472 | A1 | 8/2004 | Nagahara | WO | WO 99/41732 | 8/1999 |
| 2004/0173886 | A1 | 9/2004 | Carley | WO | WO9952006 A2 | 10/1999 |
| 2004/0174583 | A1 | 9/2004 | Chen et al. | WO | WO9952006 A3 | 10/1999 |
| 2004/0179281 | A1 | 9/2004 | Reboa | WO | WO 00/16105 | 3/2000 |
| 2004/0183990 | A1 | 9/2004 | Guang et al. | WO | WO 01/45140 | 6/2001 |
| 2004/0184133 | A1 | 9/2004 | Su et al. | WO | WO 01/58804 | 8/2001 |
| 2004/0212026 | A1 | 10/2004 | Van Brocklin et al. | WO | WO 02/42716 A2 | 5/2002 |
| 2004/0217378 | A1 | 11/2004 | Martin et al. | WO | WO03007049 A1 | 1/2003 |
| 2004/0217919 | A1 | 11/2004 | Pichl et al. | WO | WO 03/023849 | 3/2003 |
| 2004/0218251 | A1 | 11/2004 | Piehl et al. | WO | WO 03/026369 A1 | 3/2003 |
| 2004/0218334 | A1 | 11/2004 | Martin et al. | WO | WO 03/054925 | 3/2003 |
| 2004/0218341 | A1 | 11/2004 | Martin et al. | WO | WO 00/17695 | 8/2003 |
| 2004/0227493 | A1 | 11/2004 | Van Brocklin et al. | WO | WO 03/070625 | 8/2003 |
| 2004/0240032 | A1 | 12/2004 | Miles | WO | WO03069413 A1 | 8/2003 |
| 2004/0240138 | A1 | 12/2004 | Martin et al. | WO | WO03073151 A1 | 9/2003 |
| 2004/0245588 | A1 | 12/2004 | Nikkel et al. | WO | WO 03/084861 | 10/2003 |
| 2004/0263944 | A1 | 12/2004 | Miles et al. | WO | WO 03/095706 | 11/2003 |
| 2005/0001828 | A1 | 1/2005 | Martin et al. | WO | WO 03/105198 | 12/2003 |
| 2005/0002079 | A1 | 1/2005 | Novotny et al. | WO | WO2004006003 A1 | 1/2004 |
| 2005/0035699 | A1 | 2/2005 | Tsai | WO | WO2004026757 A2 | 4/2004 |
| 2005/0036095 | A1 | 2/2005 | Yeh et al. | WO | WO 04/077523 | 9/2004 |
| 2005/0036192 | A1 | 2/2005 | Lin et al. | WO | WO 2005/066596 | 7/2005 |
| 2005/0038950 | A1 | 2/2005 | Adelmann | WO | WO 2005/110914 | 11/2005 |
| 2005/0042117 | A1 | 2/2005 | Lin | WO | WO 2005/114294 | 11/2005 |
| 2005/0046919 | A1 | 3/2005 | Taguchi et al. | | | |
| 2005/0057442 | A1 | 3/2005 | Way | | | |
| 2005/0068209 | A1 | 3/2005 | Damera-Venkata et al. | | | |
| 2005/0068583 | A1 | 3/2005 | Gutkowski et al. | | | |
| 2005/0074919 | A1 | 4/2005 | Patel | | | |
| 2005/0093134 | A1 | 5/2005 | Tarn | | | |
| 2005/0167795 | A1 | 8/2005 | Higashi | | | |
| 2005/0184304 | A1 | 8/2005 | Gupta et al. | | | |
| 2005/0195462 | A1 | 9/2005 | Lin | | | |
| 2005/0253283 | A1 | 11/2005 | Dcamp et al. | | | |
| 2005/0254982 | A1 | 11/2005 | Cadeddu | | | |
| 2006/0029732 | A1 | 2/2006 | Kobrin et al. | | | |
| 2006/0066935 | A1 | 3/2006 | Cummings et al. | | | |
| 2006/0148365 | A1 | 7/2006 | Tsai | | | |
| 2006/0274400 | A1 | 12/2006 | Miles | | | |
| 2007/0170568 | A1 | 7/2007 | Chui et al. | | | |
| 2009/0103167 | A1 | 4/2009 | Tsai | | | |

FOREIGN PATENT DOCUMENTS

| | | |
|---|---|---|
| EP | 0 695 959 | 2/1996 |
| EP | 0 822 570 | 2/1998 |
| EP | 1418154 A2 | 5/2004 |
| EP | 1 433 742 | 6/2004 |
| FR | 2841380 | 12/2003 |
| JP | 61-206244 | 9/1986 |
| JP | 63-162378 | 10/1988 |
| JP | 10-70287 | 3/1998 |
| JP | 08-162006 | 6/1998 |
| JP | 11-337953 | 12/1999 |
| JP | 2001-318324 | 11/2001 |
| JP | 2001-351998 | 12/2001 |
| JP | 2002-062491 | 2/2002 |
| JP | 2002-062492 | 2/2002 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K., et al., "Surface micromachined tuneable interferometer array," Sensors and Actuators, pp. 17-23. (1994).

Conner, "Hybrid Color Display Using Optical Interference Filter Array," SID Digest, pp. 577-580 (1993).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).

Gosch, "West Germany Grabs the Lead in X-Ray Lithography," Electronics pp. 78-80 (Feb. 5, 1987).

Howard et al., "Nanometer-Scale Fabrication Techniques", VLSI Electronics: Microstructure Science, vol. 5, pp. 145-153 and pp. 166-173 (1982).

Jackson "Classical Electrodynamics", John Wiley & Sons Inc., pp. 568-573, date unknown.

Jerman et al., "A Miniature Fabry-Perot Interferometer with a Corrugated Silicon Diaphragm Support", (1988).

Johnson "Optical Scanners", Microwave Scanning Antennas, vol. 1, p. 251-261, (1964).

Light over Matter, Circle No. 36 (Jun. 1993).

Miles, Mark, W., "A New Reflective FPD Technology Using Interferometric Modulation", The Proceedings of the Society for Information Display (May 11-16, 1997).

Newsbreaks, "Quantum-trench devices might operate at terahertz frequencies", Laser Focus World (May 1993).

Oliner et al., "Radiating Elements and Mutual Coupling", Microwave Scanning Antennas, vol. 2, pp. 131-141, (1966).

Raley et al., "A Fabry-Perot Microinterferometer for Visible Wavelengths", IEEE Solid-State Sensor and Actuator Workshop, Jun. 1992, Hilton Head, SC.

Sperger et al., "High Performance Patterned All-Dielectric Interference Colour Filter for Display Applications", SID Digest, pp. 81-83, (1994).

Stone, "Radiation and Optics, An Introduction to the Classical Theory", McGraw-Hill, pp. 340-343, (1963).

Walker, et al., "Electron-beam-tunable Interference Filter Spatial Light Modulator", Optics Letters vol. 13, No. 5, pp. 345-347, (May 1988).

Winton, John M., "A novel way to capture solar energy", Chemical Week, (May 1985).

Wu, "Design of a Reflective Color LCD Using Optical Interference Reflectors", ASIA Display '95, pp. 929-931, (Oct. 1995).

Liang, et al. "A Low Temperature Wafer-level hermetic MEMS package using UV curable adhesive" Electronic Components and Technology 2004, pp. 1486-1491.

EP Search Report for EP patent application No. 05255700.6 - 2217.

EP Search Report for EP patent application No. 05255684.2 - 2217.

International Search Report and written Opinion for PCT/US05/13464.

Moraja, et al., Advanced Getter Solutions at Wafer Level to Assure High Reliability to the last Generations MEMS, IEEE Reliability Physics Symposium Proceedings, 2003, pp. 458-459.

Sparks, et al. Chip-Level Vacuum Packaging of Micromachines Using NanoGetters, IEEE Transactions on Advanced Packaging, vol. 26 Issue 3, Aug. 2003, pp. 277-282.

Miles, MEMS-based interferometric modulator for display applications, Proceedings of the SPIE, Micromachined Devices and Components V, Sep. 1999, pp. 20-28.

Stark et al., An integrated process for post-packaging release and vacuum sealing of electroplated nickel packages, Transducers, 12th International Conference on Solid-State Sensors, Actuators and Microsystems, 2003, pp. 1911-1914.

European Search Report issued in European Patent Application No. 05255654.5 dated May 8, 2008.

Tilmans et al., The indent reflow sealing (IRS) technique-A method for the fabrication of sealed cavities for mems devices, Journal of Microelectromechanical Systems, 9(2), Jun. 2000.

Office Action dated Mar. 28, 2008 in Chinese App. No. 200510105034.8.

Office Action issued on Aug. 26, 2008 in related Japanese Application No. 2005-258288 (in 5 pages including English translation).

Greco et al., Optical properties of IPN-like networks polyethylene/poly(butylmethacrylate-co-styrene copolymer systems, III. Influence of copolymer crosslinkers, Polymer 42 (2001), 5089-5095.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Release | Actuate |
| $-\Delta V$ | Actuate | Release |

METHOD AND DEVICE FOR PROVIDING ELECTRONIC CIRCUITRY ON A BACKPLATE

CROSS-REFERENCE TO RELATED APPLICATIONS

This application claims priority under 35 U.S.C. § 119(e) to U.S. Provisional Application No. 60/613,977, filed on Sep. 27, 2004, which is hereby incorporated by reference in its entirety.

BACKGROUND OF THE INVENTION

1. Field of the Invention

The field of the invention relates to microelectromechanical systems (MEMS). More specifically, the field of the invention relates to interferometric modulator based displays.

2. Description of the Related Technology

Display devices such as LCDs generally require electronic controlling circuitry located exterior to a protective package surrounding the display element. For example, an LCD comprises two sheets of glass surrounding a liquid crystal element. Controlling an LCD typically requires circuitry external to the package formed by the two sheets of glass. Positioning such controlling circuitry exterior to this protective package necessarily increases either the footprint or the height of the device.

Other types of displays are based on microelectromechanical systems (MEMS). These MEMS can include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one embodiment, a display is provided, including a transparent substrate, an array of interferometric modulators comprising reflective elements that are configured to reflect light through the transparent substrate, a backplane comprising a first surface proximal to the array of interferometric modulators and comprising electronic circuitry fabricated on the first surface of the backplane, wherein the electronic circuitry is configured to control the movement of the reflective elements, and a plurality of electrical connections providing electronic communication between the electronic circuitry on the backplane and the array of interferometric modulators.

In another embodiment, a method of fabricating a display is provided, including providing a transparent substrate comprising an array of interferometric modulators on a first surface of the transparent substrate, wherein the modulators comprise reflective elements, providing a backplate having a first surface, forming electronic circuitry on the first surface of the backplate, wherein the electronic circuitry is configured to control the state the reflective elements, and positioning the transparent substrate and the backplate such that the first surface of the transparent substrate is located proximal the first surface of the backplate and the electronic circuitry is placed in electrical connection with the array of interferometric modulators.

In another embodiment, a display is provided, wherein the display is manufactured by a process including providing a transparent substrate having a first surface, forming an array of interferometric modulators on the first surface of the transparent substrate, wherein the modulators comprise reflective elements, providing a backplate having a first surface, forming electronic circuitry on the first surface of the backplate, wherein the electronic circuitry is configured to control the state the reflective elements, and positioning the transparent substrate and the backplate such that the first surface of the transparent substrate is located proximal the first surface of the backplate and the electronic circuitry is placed in electrical connection with the array of interferometric modulators.

In another embodiment, a device is provided, including an interferometric modulator-based display, the display including a transparent substrate, the transparent substrate comprising a first substrate surface, an array of interferometric modulators comprising reflective elements that are configured to reflect light through the transparent substrate, aa backplane comprising a first surface proximal to the array of interferometric modulators, wherein the first surface of the backplane comprises electronic circuitry configured to control the movement of the reflective elements, and a plurality of electrical connections providing electronic communication between the electronic circuitry on the backplane and the array of interferometric modulators.

In another embodiment, a display is provided, the display including a transparent substrate, the transparent substrate comprising a first substrate surface, an array of interferometric modulators comprising reflective elements that are configured to reflect light through the transparent substrate, a backplane comprising a first surface proximal to the array of interferometric modulators, wherein the first surface of the backplane comprises electronic circuitry configured to control the movement of the reflective elements, and means for providing electronic communication between the electronic circuitry on the backplane and the array of interferometric modulators.

DETAILED DESCRIPTION OF THE PREFERRED EMBODIMENT

An embodiment of the invention, as discussed in greater detail below, is an interferometric modulator-based display wherein the backplate contains electronic circuitry fabricated on the interior side of the backplate. This electronic circuitry is capable, among other things, of controlling the state of the array of interferometric modulators. This is useful, for example, in order to provide the display driver circuit within the display package. The fabrication of the driver chip within the display package, and on the interior side of the backplate advantageously permits greater flexibility in the design of the electronic circuitry. In addition, such fabrication advantageously permits optimal use of space within the display, permitting the creation of a device which may be thinner and/or have a smaller footprint than prior devices. The fabrication of the electronic circuitry, rather than the use of existing driver chips, may also result in significant cost savings.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
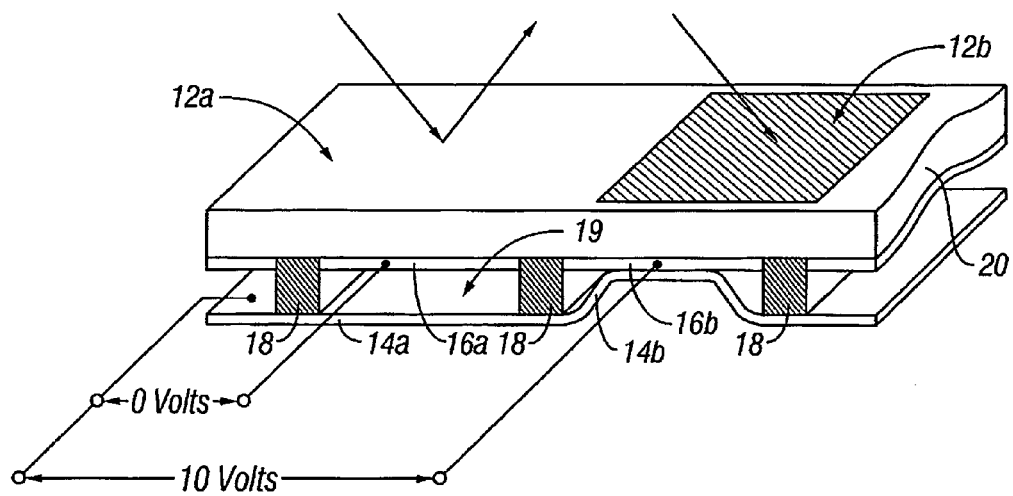
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
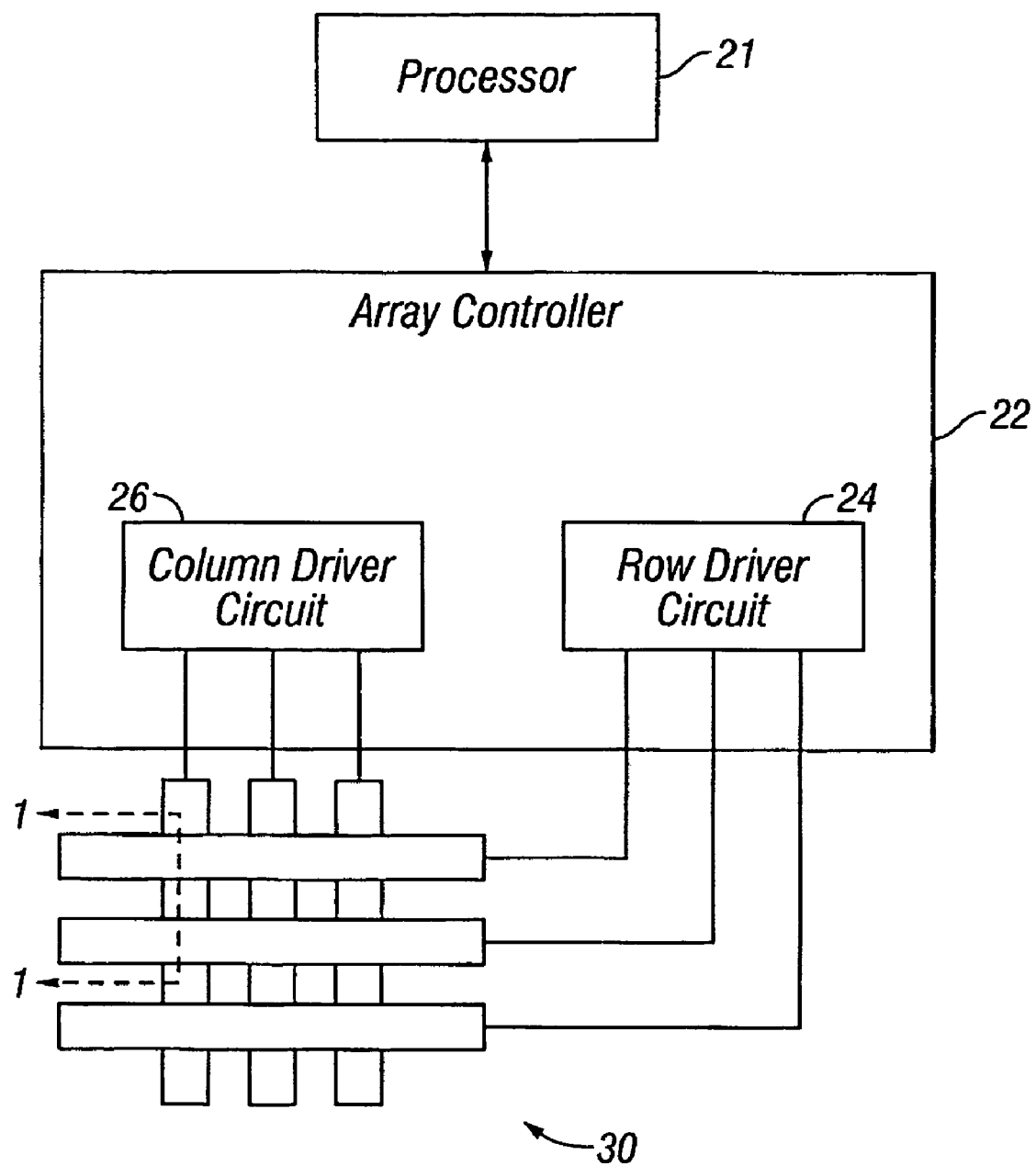
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
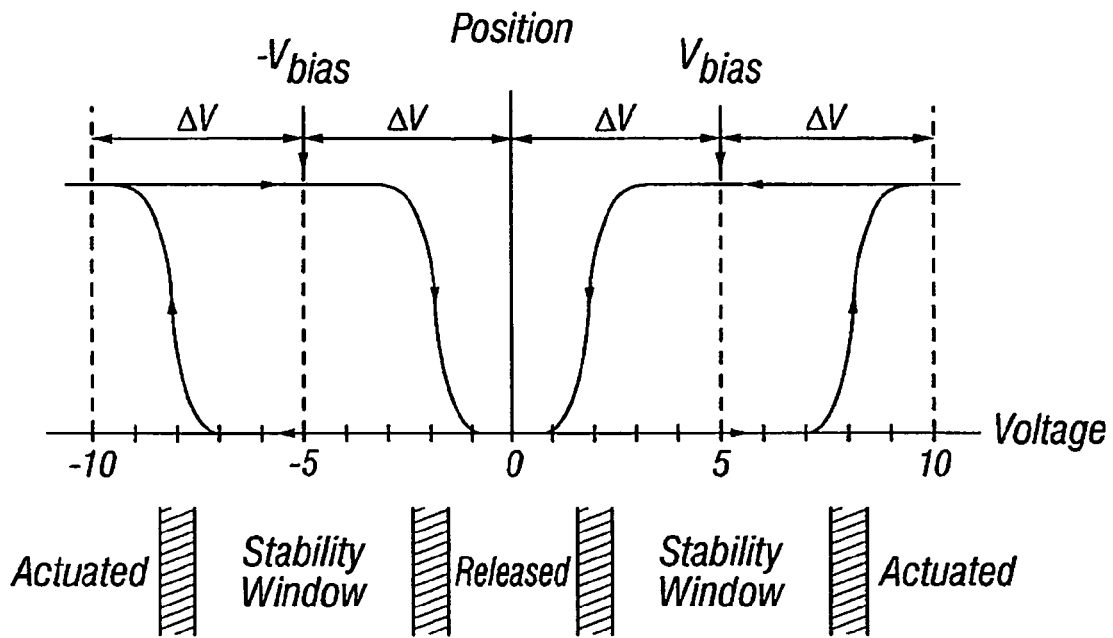
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
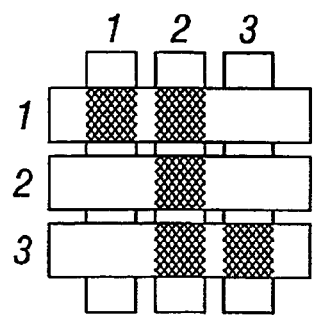
FIGS. 5A and 5B illustrate one exemplary timing diagram for row and column signals that may be used to write a frame of display data to the 3×3 interferometric modulator display of FIG. 2.
Figure 5B:
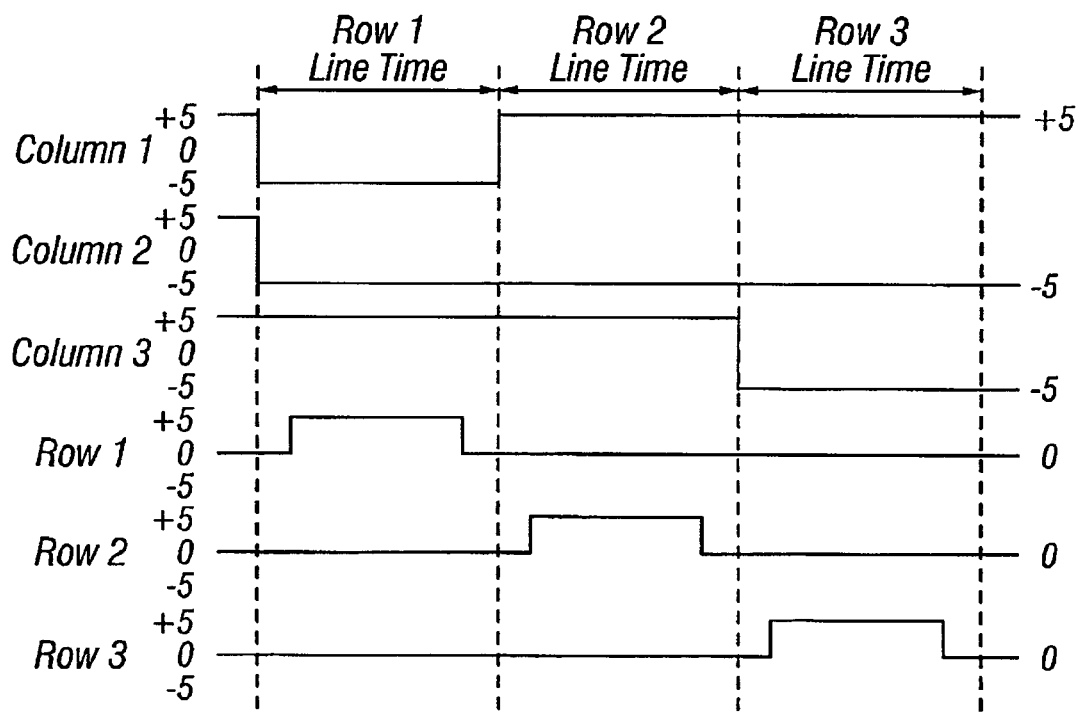

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
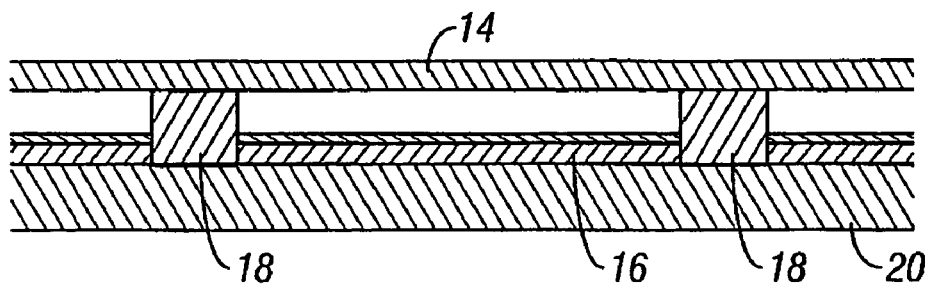
FIG. 6A is a cross section of the device of FIG. 1.
Figure 6B:
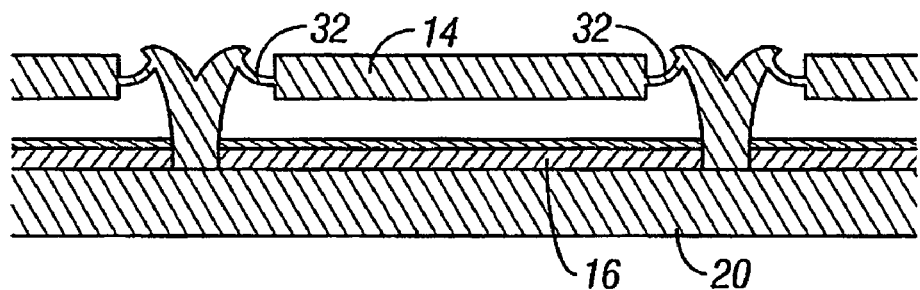
FIG. 6B is a cross section of an alternative embodiment of an interferometric modulator.
Figure 6C:
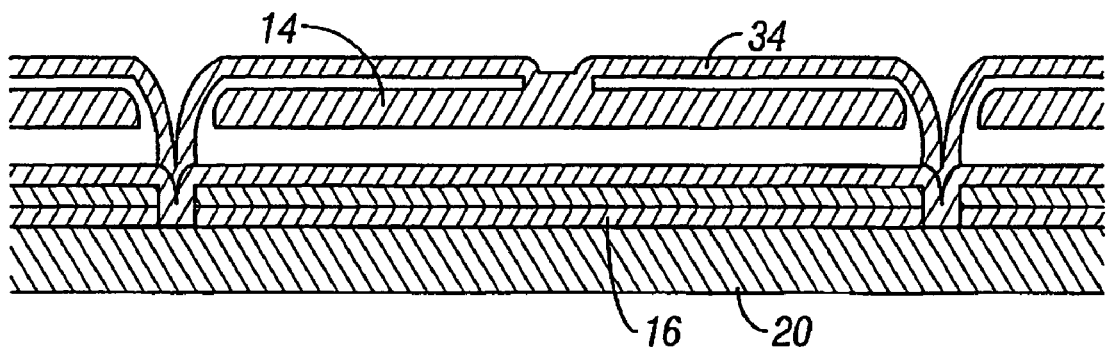
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Figure 7:
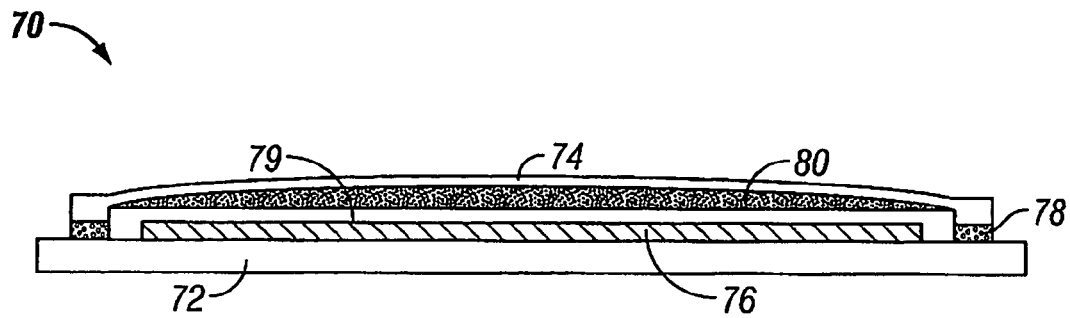
FIG. 7 is a cross-sectional view of a basic package structure for an interferometric modulator-based display.

The moving parts of a MEMS device, such as an interferometric modulator array, preferably have a protected space in which to move. Packaging techniques for a MEMS device will be described in more detail below. A schematic of a basic package structure for a MEMS device, such as an interferometric modulator array, is illustrated in FIG. 7. As shown in FIG. 7, a basic package structure 70 includes a substrate 72 and a backplane cover or "cap" 74, wherein an interferometric modulator array 76 is formed on the substrate 72. This cap 74 is also called a "backplate".

The substrate 72 and the backplane 74 are joined by a seal 78 to form the package structure 70, such that the interferometric modulator array 76 is encapsulated by the substrate 72, backplane 74, and the seal 78. This forms a cavity 79 between the backplane 74 and the substrate 72. The seal 78 may be a non-hermetic seal, such as a conventional epoxy-based adhesive. In other embodiments, the seal 78 may be a polyisobutylene (sometimes called butyl rubber, and other times PIB), o-rings, polyurethane, thin film metal weld, liquid spin-on glass, solder, polymers, or plastics, among other types of seals that may have a range of permeability of water vapor of about 0.2-4.7 g mm/m$^2$kPa day. In still other embodiments, the seal 78 may be a hermetic seal.

In some embodiments, the package structure 70 includes a desiccant 80 configured to reduce moisture within the cavity 79. The skilled artisan will appreciate that a desiccant may not be necessary for a hermetically sealed package, but may be desirable to control moisture resident within the package. In one embodiment, the desiccant 80 is positioned between the interferometric modulator array 76 and the backplane 74. Desiccants may be used for packages that have either hermetic or non-hermetic seals. In packages having a hermetic seal, desiccants are typically used to control moisture resident within the interior of the package. In packages having a non-hermetic seal, a desiccant may be used to control moisture moving into the package from the environment. Generally, any substance that can trap moisture while not interfering with the optical properties of the interferometric modulator array may be used as the desiccant 80. Suitable desiccant materials include, but are not limited to, zeolites, molecular sieves, surface adsorbents, bulk adsorbents, and chemical reactants.

The desiccant 80 may be in different forms, shapes, and sizes. In addition to being in solid form, the desiccant 80 may alternatively be in powder form. These powders may be inserted directly into the package or they may be mixed with an adhesive for application. In an alternative embodiment, the desiccant 80 may be formed into different shapes, such as cylinders or sheets, before being applied inside the package.

The skilled artisan will understand that the desiccant 80 can be applied in different ways. In one embodiment, the desiccant 80 is deposited as part of the interferometric modulator array 76. In another embodiment, the desiccant 80 is applied inside the package 70 as a spray or a dip coat.

The substrate 72 may be a semi-transparent or transparent substance capable of having thin film, MEMS devices built upon it. Such transparent substances include, but are not limited to, glass, plastic, and transparent polymers. The interferometric modulator array 76 may comprise membrane modulators or modulators of the separable type. The skilled artisan will appreciate that the backplane 74 may be formed of any suitable material, such as glass, metal, foil, polymer, plastic, ceramic, or semiconductor materials (e.g., silicon).

The packaging process may be accomplished in a vacuum, pressure between a vacuum up to and including ambient pressure, or pressure higher than ambient pressure. The packaging process may also be accomplished in an environment of varied and controlled high or low pressure during the sealing process. There may be advantages to packaging the interferometric modulator array 76 in a completely dry environment, but it is not necessary. Similarly, the packaging environment may be of an inert gas at ambient conditions. Packaging at ambient conditions allows for a lower cost process and more potential for versatility in equipment choice because the device may be transported through ambient conditions without affecting the operation of the device.

Generally, it is desirable to minimize the permeation of water vapor into the package structure and thus control the environment inside the package structure 70 and hermetically seal it to ensure that the environment remains constant. An example of a hermetic sealing process is disclosed in U.S. Pat. No. 6,589,625. When the humidity within the package exceeds a level beyond which surface tension from the moisture becomes higher than the restoration force of a movable element (not shown) in the interferometric modulator 10, the movable element may become permanently stuck to the surface. If the humidity level is too low, the moisture charges up to the same polarity as the movable element when the element comes into contact with the coated surface.

As noted above, a desiccant may be used to control moisture resident within the package structure 70. However, the need for a desiccant can be reduced or eliminated with the implementation of a hermetic seal 78 to prevent moisture from traveling from the atmosphere into the interior of the package structure 70.

The continued reduction in display device dimensions restricts available methods to manage the environment within the package structure 70 because there is less area to place a desiccant 80 within the package structure 70. The elimination of the need for a desiccant also allows the package structure 70 to be thinner, which is desirable in some embodiments. Typically, in packages containing desiccants, the lifetime expectation of the packaged device may depend on the lifetime of the desiccant. When the desiccant is fully consumed, the interferometric modulator device may fail as sufficient moisture enters the package structure and damages the interferometric modulator array. In some embodiments, the packaging of the MEMS component, an interferometric modulator based display for this embodiment, provides a medium on which electronic components including drivers, processors, memory, and others are mounted and interconnected, usually using an electronic circuit board. Although the backplate of the interferometric modulator matrix typically serves no other purpose than to provide a barrier to particles and gasses that may interfere with the functioning of the array, it could have other functions. By relying instead on a multilayer laminate backplate, the backplate could function to protect the interferometric modulator, along with the functions of supporting and interconnecting the aforementioned parts and components. The laminate backplane may also serve as interconnection between driver components and the display itself.

Figure 8:
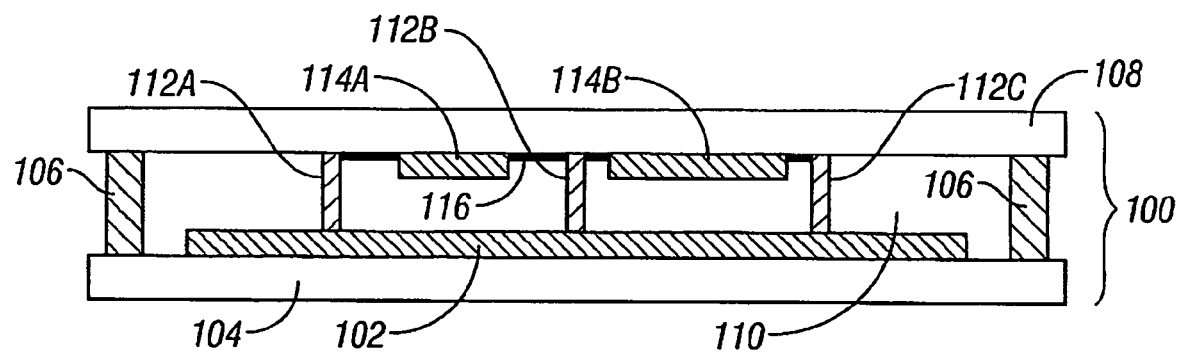
FIG. 8 is a cross-sectional view of a package structure for an interferometric modulator-based display in which electronic components are located on the underside of the backplate.

FIG. 8 illustrates an embodiment of a package structure 100 in which a backplate 108 serves as support for a variety of electronic components. As shown in the figure, an array 102 of interferometric modulators is located on a transparent substrate 104. The array 102 thus provides a means for modulating light and reflecting it through the substrate 104 towards a viewer, and the substrate 104 provides a means for supporting the array 102. Sealant 106 joins transparent substrate 104 to the backplate 108, forming a protective cavity 110 around the array 102. In this embodiment, posts 112, which are located within the array 102 of interferometric modulators, provide additional support for the backplate 108, preventing the backplate from coming into contact with the array 102. The backplate 108 provides physical support for various electronic components 114A,B, discussed in greater detail below, which are located on the underside of the backplate 108.

In certain embodiments in which certain of the posts 112A-C are conductive, an electrical connection between the electronic components 114A,B and the array 102 can be made by bringing the conductive posts 112A-C into contact with conductive traces 116 located on the backplate 108, which are in electrical connection with the components 114A,B. Thus, such conductive posts and traces provide a means for placing the electronic components 114A,B in electrical communication with the array 102.

In alternate embodiments in which the backplate provides physical support for electronic components, an electrical connection between the electronic components and the array can be made, in one example, by bringing conductive bumps located on the substrate into contact with conductive bumps located on the backplate. As another example, an electrical connection between the backplate and the interferometric array can be made by bringing conductive posts into contact with conductive bumps located on the backplate. A layer of anisotropic conducting film (ACF) or other conducting material can be employed in making these electrical connections, or these connections may be metal-to-metal connections, e.g. between two conductive bumps. Such alternate embodiments also provide means for placing the electronic components in electrical communication with the array.

In further embodiments, a flex cable or similar connector may be used to provide an electrical connection between a surface of the backplate and a surface of the interferometric modulator. It will also be understood that the electronic components need not be located on the underside of the backplate, as depicted in the embodiment of FIG. 8. Some or all of the electronic components may be located on the upper surface of the backplate and an electrical connection may be made through the backplate using vias or electrical feedthroughs.

Figure 9:
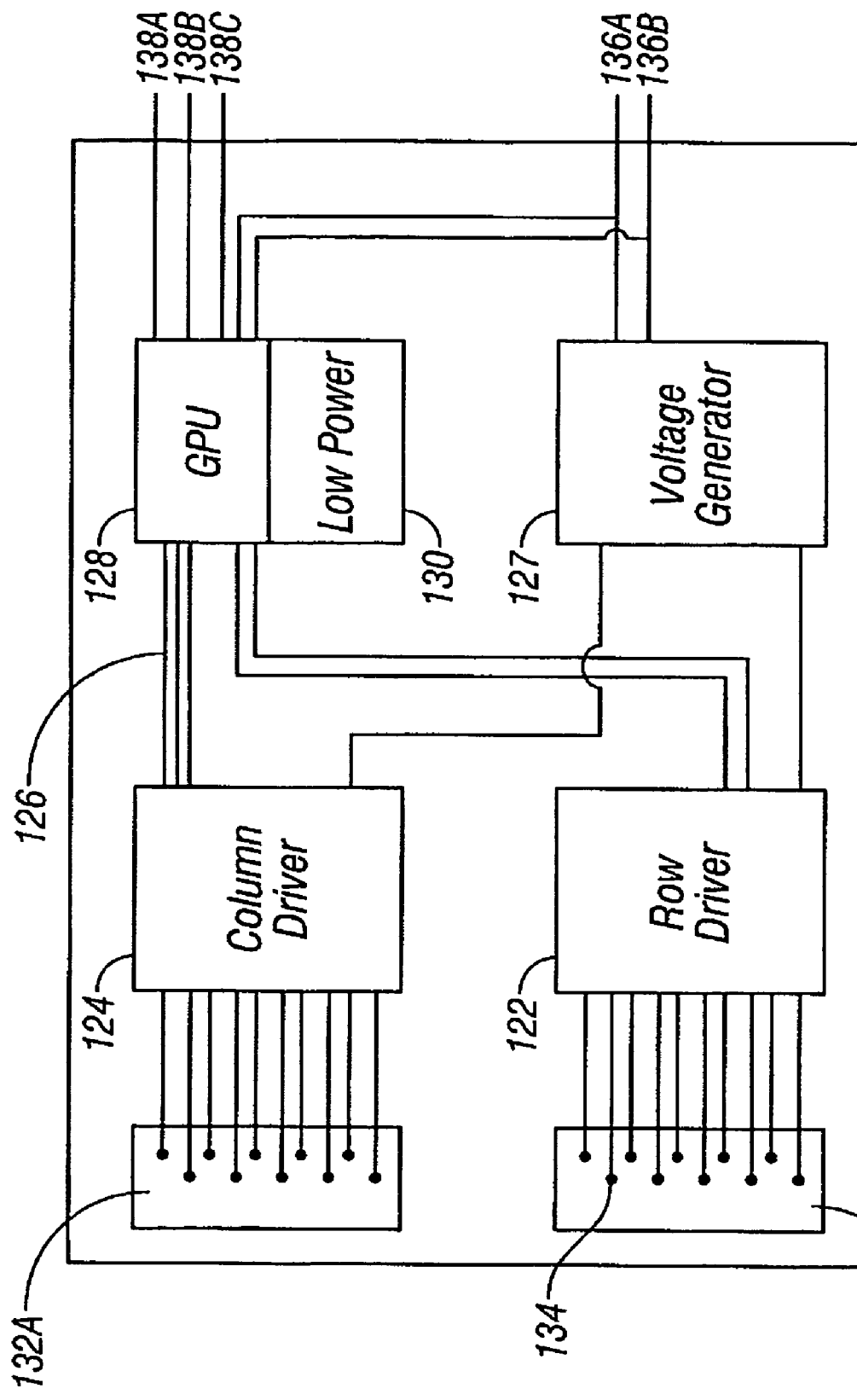
FIG. 9 is a view of the underside of a backplate which provides physical support for a variety of electronic components.

FIG. 9 shows a view of the underside of a backplate 120 onto which various electronic components have been fabricated. Row driver circuit 122 and column driver circuit 124 are located on the backplate 120, and electrical connections to and between the driver circuits 122, 124 are provided through conductive traces 126. The driver circuits 122, 124 are in electrical connection with a voltage generator 127 via traces 126. The driver circuits 122, 124 are also in electrical communication with pads 132a and 132b, containing conductive bumps 134. A graphical processing unit (GPU) 128 is in electrical connection with the driver circuits 122, 124 via traces 126. In addition, low power circuitry 130 is in electrical connection with GPU 128.

Pads 132a, 132b are configured to align with corresponding pads located on the upper surface of a transparent substrate, onto which an array of interferometric modulators is provided. The corresponding pads on the transparent substrate have conductive bumps, and are in electrical connection with the columns and the rows, respectively, of the array of interferometric modulators on the transparent substrate. Thus, bump-to-bump connections of the type discussed previously provide an electrical connection between the outputs of the driver circuits 122, 124 and the rows and columns of the array. As discussed previously, one row of the array at a time may be addressed at a time by using the column driver circuit 124 to provide information to each column, and strobing the row to be addressed via the row driver circuit 122. Thus, the electronic components such as the driver circuitry provide a means for controlling the state of the array of interferometric elements, and the backplate 120 provides a means for supporting the electronic circuitry.

The voltage generator can be, for example, a commercially available unit, such as the Maxim MAX1605, MAX686, MAX1955 or MAX1561, or any circuitry which is capable of performing the desired voltage adjustments. In alternate preferred embodiments, the voltage generator can be developed for the specific application for which it is being used. The voltage generator 127 is provided with two inputs, 136a, 136b. In the embodiment of FIG. 9, the first input 136a is at a supply voltage (e.g. 3.3 V), and the second input 134b is at ground. The voltage generator supplies modified voltages to the row and column drivers 122, 124 via conductive traces 126, so that a potential difference greater or less than the supply voltage can be applied across a row or column. Thus, the voltage generator 127 can be step-up circuitry (also referred to as a boost circuit), or step-down circuitry.

The GPU 128 can be, for example, a commercially available unit, such as the Chips and Technology 69030. In alternate preferred embodiments, the GPU circuitry can be developed for the specific application for which it is being used. In the embodiment shown in FIG. 9, the GPU 128 is configured to accept three inputs 138A, 138B, 138C (clock, data, and control, respectively), and convert the data into a format which is required by the particular row and driver circuits 122, 124 (e.g. TFT, STN or CSTN format). In the embodiment of FIG. 9, the GPU provides three signals to the column driver 124 (clock, data, and control), and only two signals to the row driver 122 (clock and control).

The low power circuitry 130 is used to allow the display to go into a low power mode, which can maintain a displayed image with relatively little power input. This can be done, for example, by stopping the clock and data signals from the GPU 128 to the row and column driver circuitry 122, 124. The use of such a low power circuit 130 is particularly advantageous with respect to displays employing an array of interferometric modulators, because as discussed previously, once an individual modulator in an array is moved to either a released state or an actuated state, a significantly smaller bias voltage is sufficient to maintain the modulator in that position. Additionally, almost no power is dissipated during this process, as discussed above.

It will be understood that the electrical components depicted in FIG. 9 are exemplary. Other embodiments may include more or less electrical components, and multiple functions may be performed by a single component. In addition, while the components of FIG. 9 are all depicted as being on the underside of the backplate such that they are located within the protective cavity formed by the sealant once the package is assembled, certain of the components may be located elsewhere, such as on the top of the backplate or on a ledge of the transparent substrate extending beyond the sealant, such that the components are outside the protective cavity.

Electrical connections between the exterior of the package and the interior of the package can be made in multiple ways. When the backplane is glass, for example, or a layer of any other prefabricated material, the electrical connections may comprise conductive traces running along the surface of the backplate, such that the traces pass under the seals. When the backplate is fabricated for use as a backplate the backplate may advantageously be fabricated to include electrical vias, or feedthroughs, which provide an electrical connection between the upper and lower surface of the backplate. Such vias may be provided through glass or other prefabricated backplate materials, as well, but the addition of such vias may be more difficult, time-consuming, or costly.

In further embodiments, the electronic circuitry can be formed by depositing thin-film layers on a substrate which serves as the backplate, creating an application-specific integrated circuit (ASIC). An example of such an ASIC 140 is shown in vertical cross-section in FIG. 10. The ASIC 140 is formed by depositing layers on a thin-film deposition ASIC carrier 142, which may be, for example, a layer of glass. The carrier 142 may comprise a glass layer which serves as the backplate for a display package similar to those discussed above. Any suitable material may be used as an ASIC carrier 140.

Figure 10:
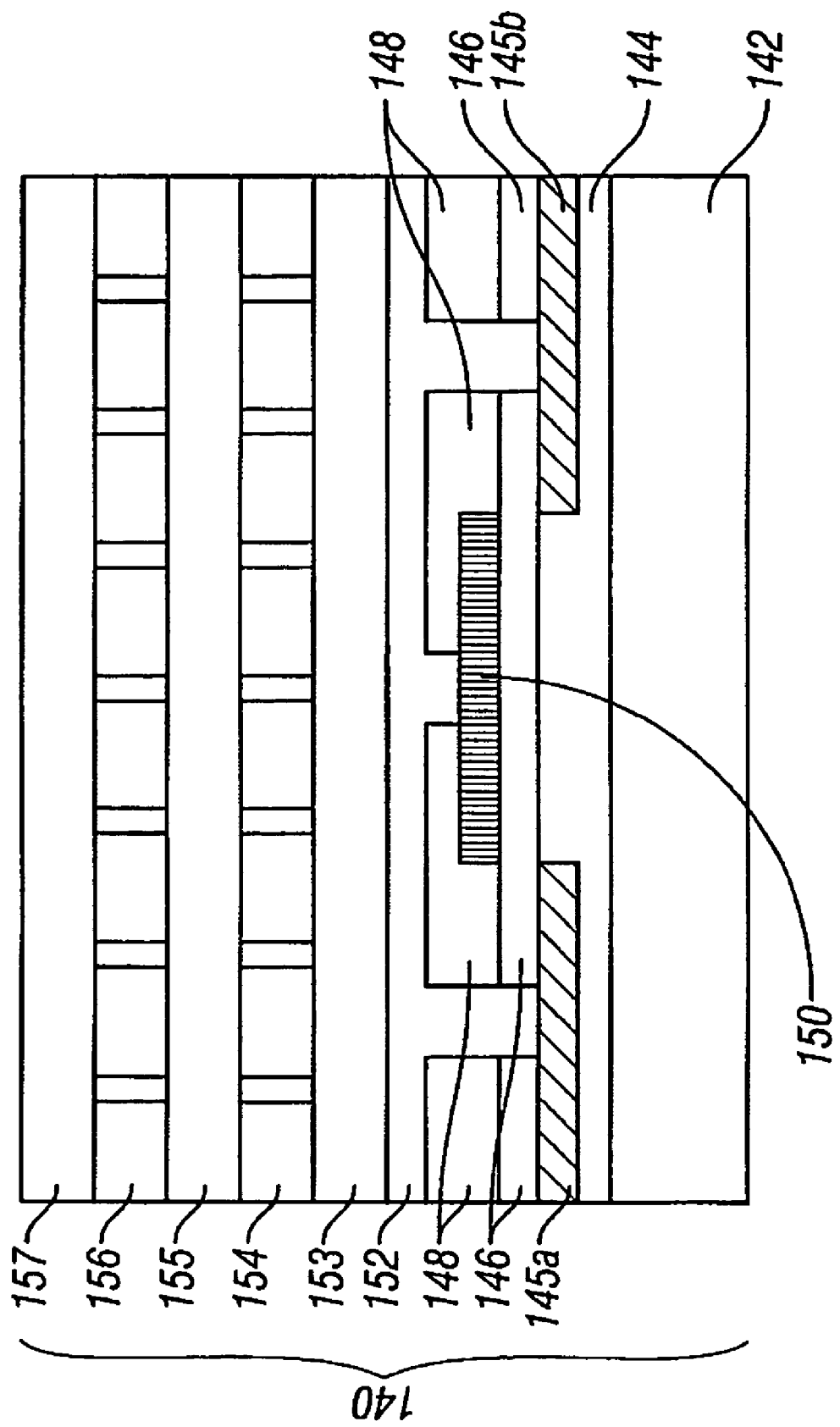
FIG. 10 is a cross-section of a backplate on which thin-film electronic circuitry has been fabricated.

Amorphous silicon is then deposited on the ASIC carrier 142. In the embodiment of FIG. 10, a layer 144 of amorphous p-type silicon has been deposited on the carrier 142, and n-type amorphous silicon is implanted in regions 145a, 145b, alternately referred to as wells. Such wells 145a,b will become the drains or sources of given transistors. In the ASIC 140, the well 145a serves as the source of a transistor and the well 145b serves as the drain. The silicon may be deposited, for example, via photolithography, or via any other appropriate technique known to those skilled in the art. The p-n junctions between the base material in layer 144 and the wells 145a,b can be formed using techniques such as rapid thermal annealing (RTA) or through the use of lasers. While a p-type transistor is depicted in FIG. 10, it will be understood that an n-type transistor can be created by depositing n-type silicon in layer 144, and implanting p-type silicon in the wells 145a,b.

The layer 144 of doped silicon is then coated with an insulation layer 146, which in the ASIC 140 of FIG. 10 is a layer of $SiO_2$, but any appropriate insulation layer may be used. The deposition can be made by means of, for example, chemical vapor deposition (CVD), or any other appropriate method. Electrically conducting material 150, which may be for example Mo, is deposited on top of the insulation layer 146 between the wells 145a,b, forming the gate of a transistor. An etch process may be used to deposit the electrically conducting material 150. An additional layer 148 of insulating material, which in this embodiment may be a nitrate such as silicon nitrate, is deposited above the electrically conducting material 150 and the insulating layer 146.

Conductive pathways through the insulating layers 148, 146 are etched, exposing the gate 150 and implant regions 145a,b. Metal 152 is deposited, forming connections to the gate 150, the source 145a, and the drain 145b, thereby creating transistors. The deposition of this metal layer can be done through the use of a mask, in order to etch the metal 152 in the proper locations to form the desired connections. Above layer 152, an additional layer of metal 153 is formed, which may comprise a series of parallel lines (not depicted). Typically, metal layers used in ASICs, such as layer 153, conduct in only one direction, due to their construction as a series of parallel lines. Connections between transistors are formed by photographically depositing metal in a desired pattern to form layer 153. Layer 153 thus forms logic functions by connecting transistors in a desired pattern.

Above layer 153, a metallic layer 154 is formed. As can be seen in the FIG. 10, layer 154 comprises a series of parallel lines oriented orthogonal to the page, and thus, perpendicular to the parallel lines in layer 153. Layer 154 is used to provide power to the ASIC 140. Above layer 154, another metal interconnect layer 155 is formed, which completes more complicated logic connections. Above interconnect layer 155, a ground layer 156 is formed. Each of layers 154-156 may comprise parallel lines, and may be patterned through photolithographic deposition. Interconnections between the metal layers may be provided through vias, which may be formed by, for example, drilling holes in the metal layers and depositing metal in the holes. In addition, although in one embodiment, the layers 153-156 comprise parallel lines, in alternate embodiments, these may be formed by depositing layers which are not made of parallel lines. Thus, by depositing or etching the metal layers, and by forming interconnections between the layers, the desired interconnections between transistors may be created.

Above layer 156, a top metal layer 157 serves as an external interconnect layer, providing connections between the logic gates and the inputs/outputs of the ASIC. In the embodiment of FIG. 10, the top metal layer 157 is not constructed of a series of parallel lines, and thus conducts in multiple directions, enabling more complex interconnection. Masking and photolithographic techniques may be used to etch the top metal layer, as may any appropriate method known to one skilled in the art. In an embodiment in which ASIC 140 forms electronic circuitry in a display package such as those previously discussed, the metal external connect layer 148 provides a connection between the ASIC 140 and the array of interferometric modulators (not shown), using any of the methods discussed in this application, or any other suitable method.

In various embodiments, the deposition carrier 144 need not comprise glass, but may rather comprise any material suitable for carrying deposited thin film circuitry. As previously discussed with respect to FIG. 9, the deposition carrier 144 may comprise any of a variety of features which enable electrical connections to be made between the interior of a display package and the exterior of a display package. These features may include, but are not limited to, electrical feedthroughs or vias, and electrical interconnection within the deposition carrier 144.

Fabrication of electronic circuitry may provide multiple advantages in the manufacture of interferometric-based display packages. The customization of the circuitry which is made possible via fabrication allows for efficient use of space. Unlike other display devices such as LCDs, interferometric modulator-based displays allow for the inclusion of electronic circuitry which is located directly above the pixel array and within the "sandwich" formed by the substrate and the backplate. By positioning as much of the required electronic circuitry in that location, rather than on a ledge of the substrate exterior to the protective cavity, the footprint of the display can be minimized. In addition, the connections between the driver circuitry and the array of interferometric modulators can be complex, requiring as much as one output and connection for every row and column in the array. By fabricating the driver circuitry, a greater amount of control over the placement of these outputs and the interconnections between these outputs and the array is available. In addition, deposition of driver circuitry or other electronic circuitry may enable the creation of display packages which are thinner and less expensive than display packages which comprise prefabricated electronic circuitry.

Figure 11:
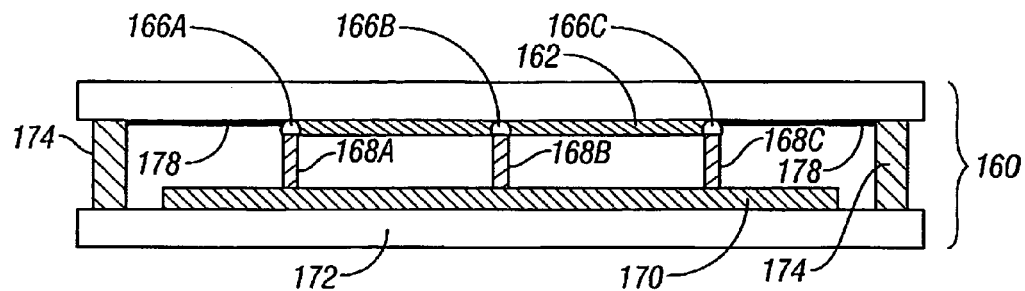
FIG. 11 is a cross-sectional view of a package structure for an interferometric modulator-based display having electronic circuitry fabricated on the underside of the backplate.

FIG. 11 shows an embodiment of a package 160 in which a electronic circuitry 162, such as driver circuitry, is fabricated via thin-film deposition on the underside of a backplate 164. Metallic bumps 166A-C are aligned with metallic spacers, or support posts, 168A-C to provide an electrical connection between the electronic circuitry 162 and an array 170 of interferometric modulators located on a substrate 172. Thus, the bumps 166A-C and posts 168A-C provide a means for electrically connecting the circuitry 162 and the array 170.

Sealant 174, along with substrate 172 and backplate 164, form a protective cavity 176 around the array 170. An electrical connection between the exterior of the package and the electronic circuitry 162 is made via conductive traces 178, which run along the underside of the backplate 164, and over the sealant 174. The number of conductive traces 178 required for operation of the electronic array depends on the type of electronic circuitry 162 fabricated on the underside of the backplate 164. When the electronic circuitry 162 comprises driver circuitry, the required number of traces 178 extending between the interior and the exterior of the package 160 can be greatly reduced. Similarly, the fabrication of GPU circuitry, boost circuitry, or low power circuitry on the underside of the backplate may simplify the required interconnection between the interior and exterior of the package 160.

While the package 160 shown in FIG. 11 includes fabricated electronic circuitry 162, it will be understood that in alternate embodiments the electronic circuitry may comprise microchips or other prefabricated circuitry integrated with the fabricated electronic circuitry. For instance, driver circuitry and boost circuitry may be fabricated on the underside of the backplate, and connected with a commercially available GPU and low power circuit.

Figure 12A:
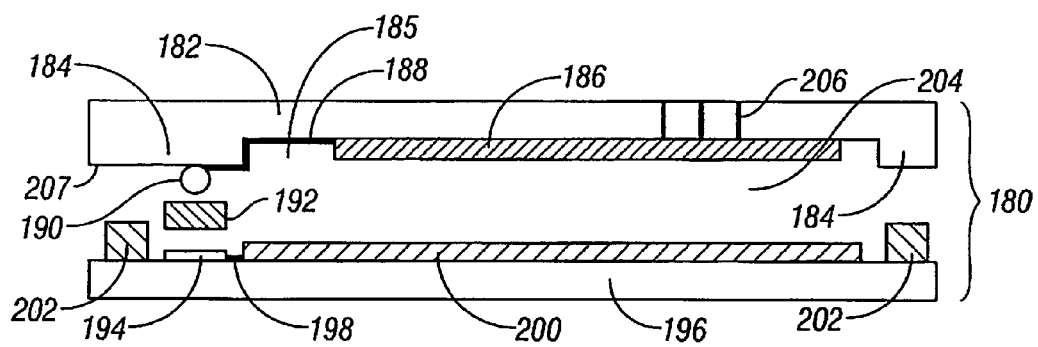
FIG. 12A is a cross-sectional view of an unassembled package structure for an interferometric modulator-based display having electronic circuitry fabricated in a depression area on the underside of the backplate, shown prior to thermocompression.
Figure 12B:
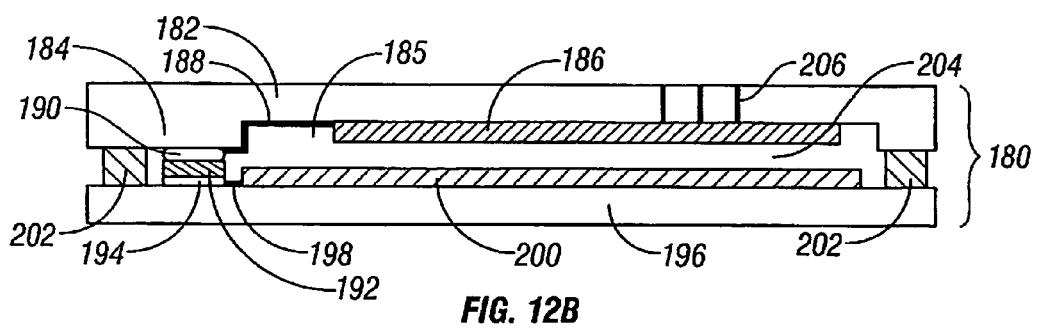
FIG. 12B is a cross-sectional view of the package structure of FIG. 12A, shown assembled and after thermocompression.

FIGS. 12A and 12B depict the assembly of a package 180 by thermal compression. FIG. 12A depicts a vertical cross-section of the package 180 prior to thermal compression, and FIG. 12B depicts a vertical cross-section of the package 180 after thermal compression.

With respect to FIG. 12A, it can be seen that a backplate 182 has a varying thickness, such that a depression area 185 is surrounded by thicker foot portions 184. Electronic circuitry 186 is deposited within the depression area 185 and is in electrical communication with the upper surface of the backplate 182 through vias 206. The electronic circuitry 186 is also in electrical communication with conductive traces 188, which run along the underside of the vias 206 and extend at least to a lower surface 207 of the foot portion 184. A gold conductive substance 190 and ACF layer 192 are positioned between the conductive traces 188 and a pad 194 located on the upper surface of transparent substrate 196. It should be realized that the pad 194 could also be a trace, bump or other connector which provides electrical communication with an array 200 of interferometric modulators. The pad 194 is in electrical communication via conductive traces 198 with the array 200 of interferometric modulators located on the upper surface of the transparent substrate 196. Sealant 202 joins the backplate 182 to the substrate 196, forming a protective cavity 204 around the array 200.

Now with respect to FIG. 12B, which depicts the package 180 in a more compact form after thermal compression, it can be seen that gold conductive substance 190 and ACF 192 are compressed, providing an electrical connection between the electronic circuitry 186 and the array 200, thereby enabling the electronic circuitry 186 to control the state of the reflective elements in the array 200. Thus, means for placing the circuitry 186 in communication with the array 200 are provided. It can be seen that the depression area 185 of the backplate 182 in which the electronic circuitry 184 was fabricated provides the electronic circuitry with clearance, protecting the circuitry from damage during the thermal compression process.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A display, comprising:

a transparent substrate;

an array of interferometric modulators comprising reflective elements that are configured to reflect light through said transparent substrate;

a backplane comprising a first surface proximal to the array of interferometric modulators and comprising an application-specific integrated circuit (ASIC) fabricated on said first surface of the backplane, wherein the ASIC comprises driver circuitry configured to control the movement of the reflective elements, the ASIC comprising a silicon layer, wherein the backplane is attached to the transparent substrate via a seal to form a cavity between the transparent substrate and the backplane, and wherein said cavity comprises an empty space between at least a portion of the array of interferometric modulators and the backplane; and a plurality of electrical connections providing electronic communication between the ASIC on the backplane and the array of interferometric modulators.

2. The display of claim 1, wherein the electrical connections comprise a first conducting material in electronic communication with said ASIC and a second conducting material in electronic communication with said array of interferometric modulators.

3. The display of claim 2, wherein the first conducting material is in electrical communication with the second conducting material through an anisotropic conducting film.

4. The display of claim 2, wherein said first conducting material comprises a bump of conducting material.

5. The method of claim 4, wherein said second conducting material comprises a bump of conducting material.

6. The display of claim 2, wherein the second conducting material comprises a conducting support post.

7. The display of claim 6, wherein the first conducting material comprises a conducting trace located on the first surface of the backplane.

8. The display of claim 6, wherein the first conducting material comprises a bump of conducting material.

9. The display of claim 1, wherein no adhesive is provided between the layer of silicon and the first surface of the backplane.

10. A device comprising an interferometric modulator-based display, said display comprising:
   a transparent substrate, said transparent substrate comprising a first substrate surface;
   an array of interferometric modulators comprising reflective elements that are configured to reflect light through said transparent substrate;
   a backplane comprising a first surface proximal to the array of interferometric modulators, wherein said first surface of the backplane supports an application-specific integrated circuit (ASIC) configured to control the movement of the reflective elements wherein the backplane is attached to the transparent substrate via a seal to form a cavity between the transparent substrate and the backplane, and wherein said cavity comprises an empty space between at least a portion of the array of interferometric modulators and the backplane; and
   a plurality of conductive support posts extending upwards from the array of interferometric modulators and contacting a first conductive material supported by the backplate and in electronic communication with the ASIC to provide electronic communication between the ASIC on the backplane and the array of interferometric modulators.

11. A display, comprising:
   a transparent substrate, said transparent substrate comprising a first substrate surface;
   an array of interferometric modulators comprising reflective elements that are configured to reflect light through said transparent substrate;
   a backplane comprising a first surface proximal to the array of interferometric modulators, wherein said first surface of the backplane supports an application-specific integrated circuit (ASIC) configured to control the movement of the reflective elements, the ASIC comprising a silicon layer, wherein the backplane is attached to the transparent substrate via a seal to form a cavity between the transparent substrate and the backplane, and wherein said cavity comprises an empty space between at least a portion of the array of interferometric modulators and the backplane; and
   means for providing electronic communication between the ASIC on the backplane and the array of interferometric modulators.

12. The display of claim 11, wherein the means for providing electronic communication comprises a first conducting material in electronic communication with said ASIC and a second conducting material in electronic communication with said array of interferometric modulators.

13. The display of claim 12, wherein the first conducting material is in electrical communication with the second conducting material through an anisotropic conducting film.

14. The display of claim 12, wherein said first conducting material comprises a bump of conducting material.

15. The display of claim 12, wherein the second conducting material comprises a conducting support post.

16. The display of claim 12, wherein the first conducting material comprises a conducting trace located on the first surface of the backplane.

17. The display of claim 11, wherein no adhesive is provided between the layer of silicon and the first surface of the backplane.

18. The device of claim 10, wherein said first conducting material comprises a bump of conducting material.

19. The device of claim 10, wherein the first conducting material comprises a conducting trace located on the first surface of the backplane.

20. The device of claim 10 wherein the ASIC fabricated on the first surface of the backplane comprises a layer of silicon fabricated on the first surface of the backplane.

21. The device of claim 2, wherein no adhesive is provided between the layer of silicon and the first surface of the backplane.

22. The device of claim 20, wherein the backplane comprises glass.

23. The device of claim 1, wherein the backplane comprises glass.

24. The device of claim 11, wherein the backplane comprises glass.

* * * * *